(12) United States Patent
Daidoji

(10) Patent No.: US 9,786,896 B2
(45) Date of Patent: Oct. 10, 2017

(54) LITHIUM-ION SECONDARY BATTERY

(75) Inventor: Takao Daidoji, Sagamihara (JP)

(73) Assignee: NEC ENERGY DEVICES, LTD., Kanagawa (JP)

( * ) Notice: Subject to any disclaimer, the term of this patent is extended or adjusted under 35 U.S.C. 154(b) by 0 days.

(21) Appl. No.: 14/241,928

(22) PCT Filed: Aug. 31, 2012

(86) PCT No.: PCT/JP2012/072123
§ 371 (c)(1),
(2), (4) Date: Feb. 28, 2014

(87) PCT Pub. No.: WO2013/031937
PCT Pub. Date: Mar. 7, 2013

(65) Prior Publication Data
US 2014/0295233 A1    Oct. 2, 2014

(30) Foreign Application Priority Data

Aug. 31, 2011   (JP) ................... 2011-188264

(51) Int. Cl.
*H01M 2/26* (2006.01)
*H01M 10/052* (2010.01)
(Continued)

(52) U.S. Cl.
CPC .......... *H01M 2/26* (2013.01); *H01M 2/06* (2013.01); *H01M 10/0431* (2013.01); *H01M 10/052* (2013.01); *H01M 10/0585* (2013.01)

(58) Field of Classification Search
None
See application file for complete search history.

(56) References Cited

U.S. PATENT DOCUMENTS 8,795,883 B2 *   8/2014   Shin et al. ................ 429/181
2001/0019797 A1   9/2001   Kezuka et al.
(Continued)

FOREIGN PATENT DOCUMENTS

CN   1316114      10/2001
CN   101090150   12/2007
(Continued)

OTHER PUBLICATIONS

Kaiya et al. (JP, 2004-311146) (a raw machine translation) (Abstract and Detailed Description) (Apr. 11, 2014).*
(Continued)

*Primary Examiner* — Patrick Ryan
*Assistant Examiner* — Carmen Lyles-Irving
(74) *Attorney, Agent, or Firm* — Sughrue Mion, PLLC

(57) ABSTRACT

A lithium-ion secondary battery includes: an electrode body in which a positive electrode and a negative electrode are stacked or wound through a separator; a plurality of positive electrode tabs drawn from the electrode body; a plurality of negative electrode tabs drawn from the electrode body; a joint portion between the positive electrode tabs and a positive electrode lead tab; and a joint portion between the negative electrode tabs and a negative electrode lead tab. Apart of a metal plate is disposed on a surface of the positive electrode tab or positive electrode lead tab in the joint portion and on a surface of the negative electrode tab or negative electrode lead tab in the joint portion and joined integrally thereto, and a remaining part of the metal plate is wound around the joint portions.

5 Claims, 6 Drawing Sheets

(51) Int. Cl.
*H01M 10/0585* (2010.01)
*H01M 2/06* (2006.01)
*H01M 10/04* (2006.01)

(56) References Cited

U.S. PATENT DOCUMENTS

| | | |
|---|---|---|
| 2008/0070111 A1 | 3/2008 | Abe et al. |
| 2009/0176155 A1 | 7/2009 | Choi |

FOREIGN PATENT DOCUMENTS

| | | |
|---|---|---|
| CN | 101305483 | 11/2008 |
| JP | 08167407 A | 6/1996 |
| JP | 9-206963 A | 8/1997 |
| JP | 2001-236947 A | 8/2001 |
| JP | 2004-311146 A | 11/2004 |
| JP | 2007-87652 A | 4/2007 |
| JP | 2008-34356 A | 2/2008 |

OTHER PUBLICATIONS

Office Action issued Jul. 3, 2015 in copending Chinese Patent Application No. 201280042581.4, with English translation.

\* cited by examiner

LITHIUM-ION SECONDARY BATTERY

CROSS REFERENCE TO RELATED APPLICATIONS

This application is a National Stage of International Application No. PCT/JP2012/072123, filed on Aug. 31, 2012, which claims priority from Japanese Patent Application No. 2011-188264, filed on Aug. 31, 2011, the contents of all of which are incorporated herein by reference in their entirety.

TECHNICAL FIELD

The present invention relates to a lithium-ion secondary battery having positive- and negative-electrode lead tabs excellent in characteristics.

BACKGROUND ART

A lithium-ion battery in which positive and negative electrodes are stacked or wound through separators is easily increased in capacity per unit battery by an increase in area of each of the positive and negative electrodes or increase in the number of each of the positive and negative electrodes to be stacked, and is thus suitably used as a battery having a large charge/discharge capacity.

In the lithium-ion secondary battery, the positive electrode is manufactured as follows: a positive electrode slurry obtained by mixing a particulate positive electrode active material, a conductive material, a binding agent, and the like is partially applied onto a strip-shaped aluminum foil surface of a collector, followed by drying, and the resultant collector is cut into a block each having a predetermined size. The negative electrode is manufactured in the same way. The procedure is as follows: a negative electrode slurry obtained by mixing a particulate negative electrode active material, a conductive material, a binding agent, and the like is intermittently applied onto a strip-shaped copper foil surface of a collector, followed by drying, and the resultant collector is cut into a block each having a predetermined size.

In the lithium-ion secondary battery, after producing a battery element by laminating a plurality of positive electrodes and a plurality of negative electrodes through separators, electrode tabs each formed integrally with the collector of each electrode or electrode tabs each produced by joining a conductive member to the collector are joined respectively to positive- and negative-electrode lead tabs each having high strength by ultrasonic joining and then accommodated in an outer covering, followed by sealing.

It is known that, in performing the ultrasonic joining for a thin member such as a metal foil, a thin member such as an electrode lead tab is damaged. To cope with this, many approaches are proposed, in which a protective member is interposed between the electrode tab and electrode lead tab, and these members are collectively joined together (see, for example, Patent Document 1).

CITATION LIST

Patent Document

[Patent Document 1] JP09-206963A

DISCLOSURE OF THE INVENTION

Problems to be Solved by the Invention

By disposing a protective metal plate on a side at which an ultrasonic horn abuts against a joint portion when the positive- and negative-electrode tabs each formed of a metal foil are joined respectively to the positive- and negative-electrode lead tabs by the ultrasonic joining, it is possible to prevent the metal foil of the joint portion from being damaged. However, a burr or a projection is inevitably formed in the joint portion at the time of the ultrasonic joining. Further, in order to increase an effective electrode surface of a battery, the joint portion needs to be brought close to an active material application surface of the battery electrode as much as possible; however, the closer the joint portion is brought to the active material application surface, the more difficult cutting of the protective metal plate to be performed after welding of the joint portion becomes.

FIGS. 6A and 6B are views for explaining an electrode stacked body obtained by laminating positive and negative electrodes through a separator. FIG. 6A is a plan view of the electrode stacked body. FIG. 6B is a cross-sectional view taken along a B-B' line of FIG. 6A.

A positive electrode lead tab 115 and a negative electrode lead tab 215 are attached to an electrode stacked body 400 obtained by laminating the positive and negative electrodes through the separator.

In a joint portion 110 between a plurality of metal foil positive electrode tabs 105 and the positive electrode lead tab 115, a metal plate 120 is disposed as a protective member, and the metal foil positive electrode tabs 105, positive electrode lead tab 115, and metal plate 120 are collectively joined together. With this configuration, the positive electrode tabs 105 and positive electrode lead tab 115 can form the joint portion 110 without being damaged.

Before the ultrasonic joining, the positive electrode lead tab 115 is placed on an anvil having a corrugated surface, the plurality of positive electrode tabs 105 are put on a predetermined position of an upper surface of the positive electrode lead tab 115, the metal plate 120 as the protective member is disposed on the positive electrode tabs 105, and a horn of an ultrasonic joining apparatus is made to abut against the metal plate 120. When the ultrasonic joining is performed in this state, a surface abnormal portion 140, such as a burr or a projection, is inevitably caused on surfaces of the positive electrode lead tab 115 and metal plate 120.

The surface abnormal portion 140 such as the burr or projection caused in the joint portion between the positive electrode tabs 105 and positive electrode lead tab 115 may contact a battery constituent member to cause short-circuiting when a large impact or vibration is applied to a battery to cause an electrode body to move inside a battery outer covering. Further, when a film-like outer covering is used as the battery outer covering, the caused burr or projection may damage the file-like outer covering.

An object of the present invention is to provide a lithium-ion secondary battery capable of preventing short-circuiting inside the battery and damage on the film-like outer covering which are caused due to presence of the surface abnormal portion 140 such as the burr or projection formed in the joint portion of each of the positive electrode lead tab and negative electrode lead tab.

Means for Solving the Problems

The present invention has been made to solve the above problem, and a lithium-ion secondary battery according to the present invention includes: an electrode body in which a positive electrode and a negative electrode are stacked or wound through a separator; a plurality of positive electrode tabs drawn from the electrode body; a plurality of negative electrode tabs drawn from the electrode body; a joint portion between the positive electrode tabs and a positive electrode lead tab; and a joint portion between the negative electrode tabs and a negative electrode lead tab, wherein a part of a metal plate is disposed on a surface of the positive electrode tab or positive electrode lead tab in the joint portion and on a surface of the negative electrode tab or negative electrode lead tab in the joint portion and joined integrally thereto, and a remaining part of the metal plate is wound around the joint portions.

In the lithium-ion secondary battery according to the present invention, the metal plate is wound around both surfaces of each joint portion.

In the lithium-ion secondary battery according to the present invention, the metal plate is wound by one round or more from a portion at which it is joined to the joint portion.

In the lithium-ion secondary battery according to the present invention, the metal plate is folded back on itself so as to cover a surface abnormal portion formed at the portion at which the metal plate is joined to the joint portion and is further wound around an outer periphery of the joint portion to a portion that covers another surface abnormal portion formed on an opposite surface to a surface on which the surface abnormal portion is formed at the folded-back portion of the metal plate.

In the lithium-ion secondary battery according to the present invention, the metal plate is wound around at least one of portions at which the metal plate is joined to the joining portion.

In the lithium-ion secondary battery according to the present invention, the joining portion and metal plate are each covered with a synthetic resin layer.

In the lithium-ion secondary battery according to the present invention, the synthetic resin layer is a modified polyphenylene ether layer.

Advantages of the Invention

According to the lithium-ion secondary battery of the present invention, in the joint portions of the respective positive and negative electrodes, the positive electrode lead tab and positive electrode lead tab are joined to each other together with the metal plate, and the negative electrode lead tab and negative electrode lead tab are joined to each other together with the metal plate. Further, the remaining part of the metal plate is wound around both surface of the outer periphery of each of the joint portions. Thus, a burr, a projection, or an irregularity caused in the joint portion can be covered with the metal plate. This prevents the surface abnormal portion such as the burr, projection, irregularity caused in the joint portion from contacting battery constituent members even when an impact is applied to the battery to cause the electrode body is moved inside the battery to thereby prevent occurrence of a failure. As a result, it is possible to provide a lithium-ion secondary battery having high reliability.

BRIEF DESCRIPTION OF THE DRAWINGS

FIGS. 1A and 1B are views for explaining an embodiment of a lithium-ion secondary battery according to the present invention, in which FIG. 1A is a plan view of a stacked lithium-ion secondary battery, and FIG. 1B is a cross-sectional view taken along A-A' line (center line of a positive electrode lead tab) of FIG. 1A, which enlarges a lamination direction of a battery electrodes.

FIGS. 2A to 2C are views for explaining an embodiment of an electrode stacked body of the lithium-ion secondary battery according to the present invention, in which FIG. 2A is a plan view, FIG. 2B is a cross-sectional view taken along A-A' line of FIG. 2A, which illustrates, in an enlarged manner, the electrode stacked body during manufacturing thereof, and FIG. 2C is a cross-sectional view taken along the A-A' line of FIG. 2A, which illustrates, in an enlarged manner, the electrode stacked body after manufacturing thereof.

FIGS. 3A and 3B are views for explaining another embodiment of the electrode stacked body of the lithium-ion secondary battery according to the present invention, in which FIG. 3A is a plan view, and FIG. 3B is a cross-sectional view taken along A-A' line of FIG. 3A, which illustrates, in an enlarged manner, the electrode stacked body.

FIGS. 6A and 6B are views for explaining an electrode stacked body of a conventional lithium-ion secondary battery, in which FIG. 6A is a plan view, and FIG. 6B is a cross-sectional view taken along B-B' line of FIG. 6A, which illustrates, in an enlarged manner, the electrode stacked body.

MODE FOR CARRYING OUT THE INVENTION

The present invention will be described with reference to the drawings, taking a stacked-type lithium-ion secondary battery as an example.

Figure 1A:
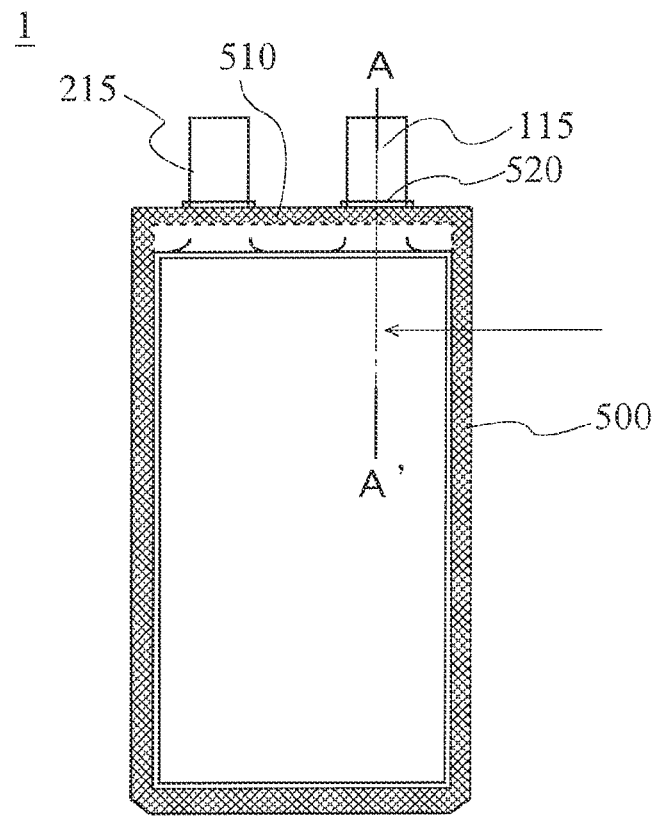
Figure 1B:
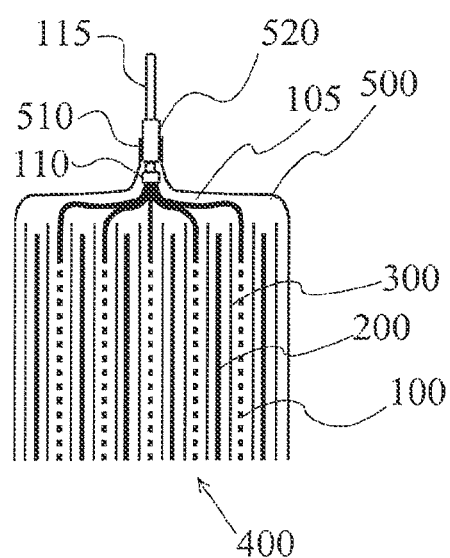

As illustrated in FIGS. 1A and 1B, a stacked-type lithium-ion secondary battery 1 according to the present invention has an electrode stacked body 400 obtained by that a positive electrode 100 and a negative electrode 200 are stacked through a separator 300. A positive electrode lead tab 115 joined to a plurality of positive electrode tabs 105 drawn from the electrode stacked body 400 in the same direction and a negative electrode lead tab 215 joined to a plurality of negative electrode tabs 205 are drawn.

The positive electrode lead tab 115 and negative electrode lead tab 215 are each drawn from a sealing portion 510 of a film-like outer covering. Further, a gasket portion 520 is provided between the positive electrode lead tab 115 and film-like outer covering 500 and between the negative electrode lead tab 215 and film-like outer covering 500 to enhance sealing characteristics.

The positive electrode lead tab 115 is joined to the positive electrode tabs 105 in the joint portion 110 by ultrasonic joining. Similarly, the negative electrode lead tab is joined to the negative electrode tabs in the joint portion by ultrasonic weld.

The positive electrode to be used in the present invention can be manufactured as follows: a slurry positive electrode mixture obtained by dispersing lithium-manganese composite oxide, lithium-cobalt composite oxide, or lithium-nickel composite oxide, a conductive material such as carbon black, and a binding agent such as polyvinylidene fluoride into N-methyl-2-pyrrolidone is intermittently applied onto both surfaces of a positive collector, followed by drying, the resultant positive collector is compressed using a roller press for shaping to obtain a positive electrode base material, and the obtained positive electrode base material is cut into blocks each having a predetermined size.

The negative electrode is manufactured as follows: a slurry negative electrode mixture obtained by dispersing a carbon material that absorbs and releases lithium ions, a conductive material such as carbon black, a binding agent such as polyvinylidene fluoride into N-methyl-2-pyrrolidone is intermittently applied onto both surfaces of a negative collector formed of a strip-shaped copper foil, followed by drying, the resultant negative collector is compressed using a roller press for shaping, and an obtained negative electrode base material is cut into blocks each having a predetermined size as in the case of the positive electrode.

The film-like outer covering may be formed of a stacked body including a material having strength and heat resistance, such as nylon or polyethylene terephthalate, used for an outer surface side of an aluminum foil and a material having improved thermal adhesive characteristics, such as polypropylene or polyethylene, used for an inner surface side of the aluminum foil.

The outer covering of the lithium-ion secondary battery is not limited to the film-like outer covering as described above, but a synthetic resin compact having a concave portion or metal container may be used.

Figure 2A:
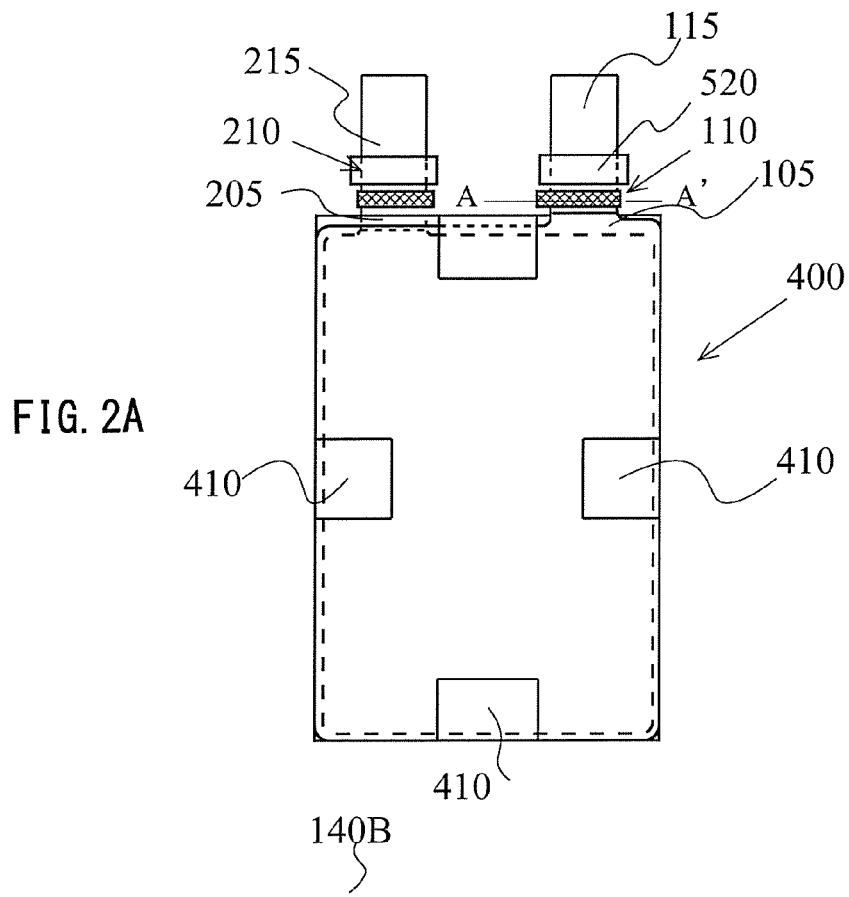
Figure 2B:
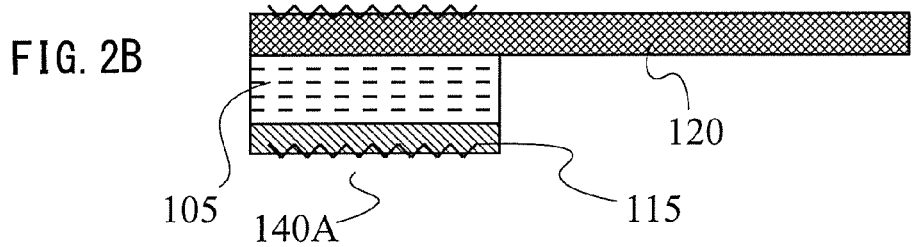
Figure 2C:
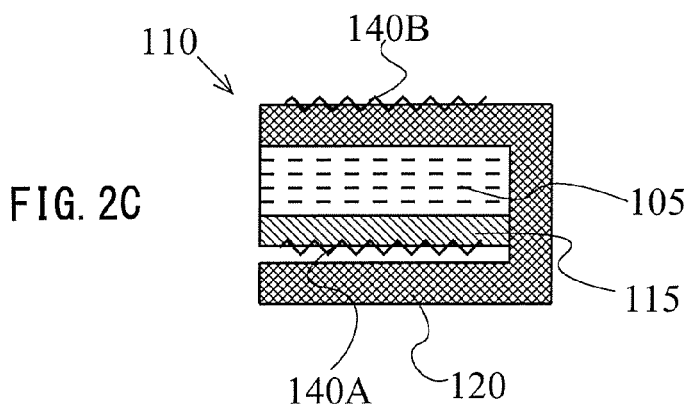

The following describes an electrode body according to the present invention with reference to FIGS. 2A to 2C. In FIGS. 2A to 2C, FIGS. 3A, 3B, and FIGS. 4A to 4C, the positive electrode and negative electrode have the same configuration excluding their constituent materials, so that mainly the positive electrode will be described.

As illustrated in FIG. 2A, the electrode stacked body 400 is obtained by laminating the positive electrode 100 and negative electrode 200 through the separator 300 and fixing the positive electrode 100, negative electrode 200, and the separator 300 by an adhesive tape 410 for prevention of displacement.

The plurality of positive electrode tabs 105 are joined to the positive electrode lead tab 115 in the joint portion 110. Further, the negative electrode lead tab 215 and negative electrode lead terminal 205 are joined to each other in a joint portion 210.

FIG. 2B is a cross-sectional view taken along A-A' line of FIG. 2A.

The positive electrode lead tab 115 is placed on the anvil of the ultrasonic joining apparatus, the plurality of positive electrode tabs 105 are placed on the positive electrode lead tab 115, a metal plate 120 is placed on an upper surface of the positive electrode tabs 105, and a horn of the ultrasonic joining apparatus is made to abut against the metal plate 120, whereby the joint portion 110 is integrally formed.

Subsequently, as illustrated in FIG. 2C, the metal plate 120 is bent toward the positive electrode lead tab side, whereby a formation process of the joint portion 110 is completed.

In the joint portion 110, a surface abnormal portion 140A caused on the positive electrode lead tab is covered with the metal plate 120, so that it is possible to provide a lithium-ion secondary battery having an electrode body which is unlikely to cause damage by the surface abnormal portion and thus has excellent characteristics.

Further, although a surface abnormal portion 140B is formed on a surface of the metal plate 120 of the joint portion 110, the positive electrode lead tab 115 is formed of a material having a larger thickness and a higher hardness than those of the metal plate 120. The burr, projection, or irregularity formed as the surface abnormal portion caused by the ultrasonic weld is more likely to damage the outer covering in a case where it is formed in metal having higher hardness. Therefore, although both the surface abnormal portions are preferably covered, it is possible to adopt a configuration in which only the surface abnormal portion 140A formed on the positive electrode lead tab 115 having a higher hardness is covered, depending on a battery structure.

Figure 3A:
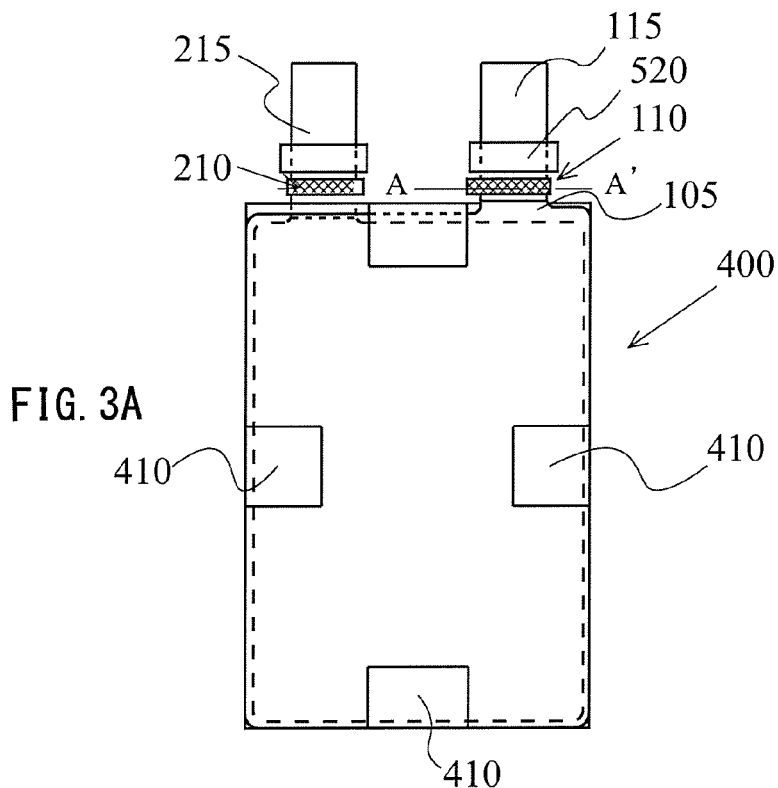
Figure 3B:
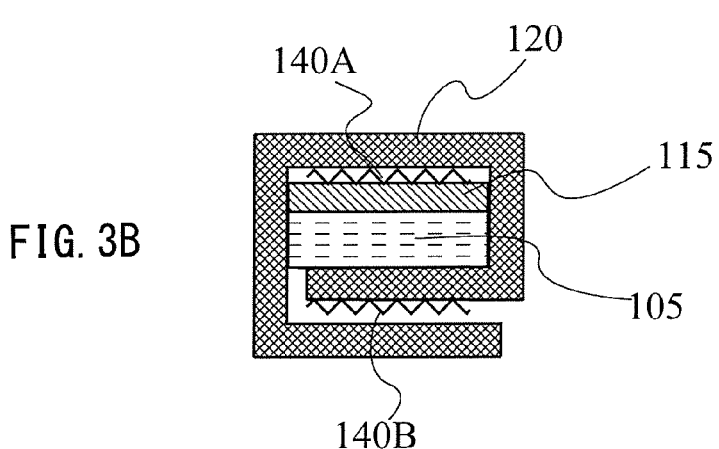

The following describes another embodiment of the electrode body according to the present invention with reference to FIGS. 3A and 3B.

As in the case of the electrode stacked body of FIGS. 2A to 2C, the electrode stacked body 400 of FIGS. 3A and 3B is obtained by laminating the positive electrode 100 and negative electrode 200 through the separator 300 and fixing the positive electrode 100, negative electrode 200, and the separator 300 by the adhesive tape 410 for prevention of displacement.

The plurality of positive electrode tabs 105 are joined to the positive electrode lead tab 115 in the joint portion 110, and the negative electrode lead tab 215 and negative electrode lead terminal 205 are joined to each other in the joint portion 210.

As illustrated in FIG. 3B which is a cross-sectional view taken along the A-A' line of FIG. 3A, the metal plate 120 is wound around the joint portion by one round or more and further extends so as to cover the joint portion. That is, the metal plate 120 covers not only the surface abnormal portion 140A caused on the positive electrode lead tab 115 but also the surface abnormal portion 140B caused on the surface of the metal plate 120 itself, so that it is possible to provide a lithium-ion secondary battery having an electrode body which is more unlikely to cause damage by the surface abnormal portion and thus has excellent characteristics.

The metal plates that cover the respective joint portions 110 and 210 can be formed of the same materials as those of the positive- and negative-electrode lead tabs, respectively. Specifically, the metal plate on the positive electrode side can be formed of aluminum which is the same material for the positive electrode lead tab, and the metal plate on the negative electrode side can be formed of nickel, a nickel-plated copper plate, or a nickel copper cladding covered with nickel, which is the same material for the negative electrode lead tab.

The positive electrode side joint portion 110 and negative electrode side joint portion 210 are each surface-covered with an insulating material and thus can further reduce influence on the battery constituent members when an impact is applied thereto.

As the insulating material, any material can be used as long as it does not adversely affect electrolyte and the like used in the lithium-ion secondary battery. Preferably, modified polyphenylene ether is used.

Figure 4A:
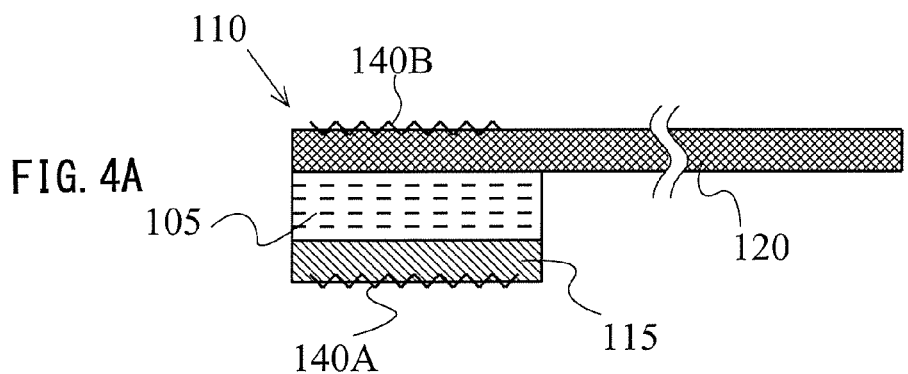
FIGS. 4A to 4C are cross-sectional views for explaining another embodiment of the present invention, which illustrate, step by step, a manufacturing process of a positive electrode side joint portion denoted by A-A' lines of FIGS. 2A and 3A.
Figure 4B:
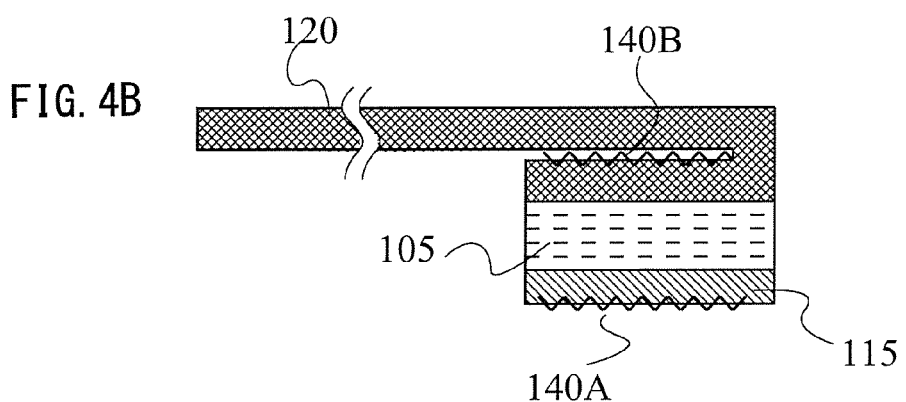
Figure 4C:
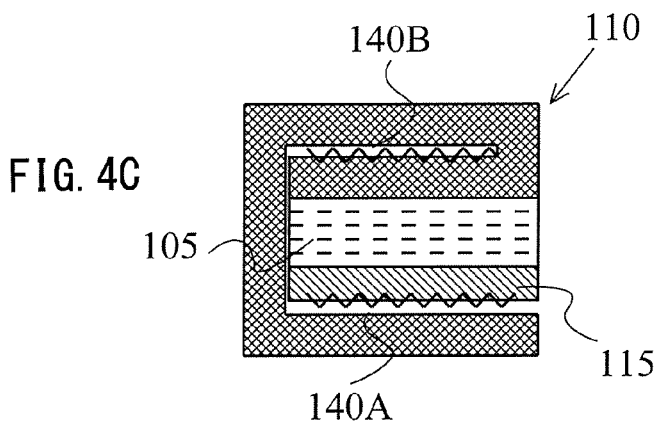

The following describes still another embodiment of the electrode body according to the present invention with reference to FIGS. 4A to 4C.

FIGS. 4A to 4C are cross-sectional views for explaining a manufacturing process of the positive electrode side joint portion denoted by A-A' lines of FIGS. 2A and 3A. As illustrated in FIG. 4A, the positive electrode lead tab 115 is placed on the anvil of the ultrasonic joining apparatus, the plurality of positive electrode tabs 105 are placed on the positive electrode lead tab 115, the metal plate 120 is placed on the upper surface of the positive electrode tabs 105, and the horn of the ultrasonic joining apparatus is made to abut against the metal plate 120, whereby the joint portion 110 is integrally formed.

Subsequently, as illustrated in FIG. 4B, the metal plate 120 is folded back on itself in a direction opposite to the positive electrode lead tab side so as to cover the surface abnormal portion 140B formed at the time of joining of the metal plate 120.

Further, as illustrated in FIG. 4C, the metal plate 120 is bent along a surface of the positive electrode side joint portion 110 so as to cover the surface abnormal portion 140A formed on the positive electrode lead tab side.

Thus, in the positive electrode side joint portion 110, not only the surface abnormal portion 140A caused on the positive electrode lead tab at the joining time, but also the surface abnormal portion 140B caused on the metal plate is covered, so that it is possible to provide a lithium-ion secondary battery having an electrode body which is unlikely to cause damage and thus has excellent characteristics.

The metal plates that cover the respective joint portions 110 and 210 can be formed of the same materials as those of the positive- and negative-electrode lead tabs, respectively. Specifically, the metal plate on the positive electrode side can be formed of aluminum which is the same material for the positive electrode lead tab, and the metal plate on the negative electrode side can be formed of nickel, a nickel-plated copper plate, or a nickel copper cladding covered with nickel, which is the same material for the negative electrode lead tab.

The negative electrode side joint portion can be formed in the same manner.

Although the present invention has been described taking, as an example, the stacked-type lithium-ion secondary battery in which the positive electrode and negative electrode are repeatedly stacked through the separator, the present invention can be applied to a wound-type lithium-ion secondary battery in which the positive electrode, separator, negative electrode, separator, — are stacked in the order mentioned and then the resultant electrode body is wound.

Figure 5:
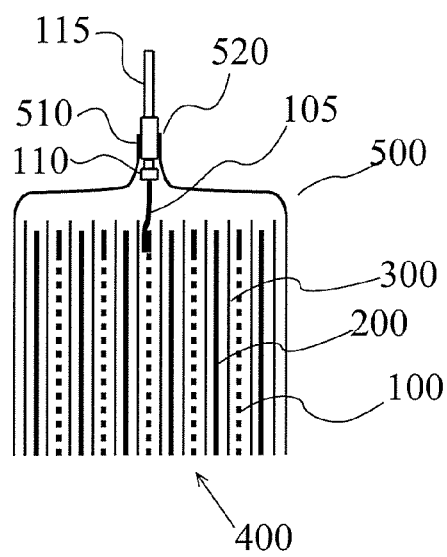
FIG. 5 is a view for explaining still another embodiment of the lithium-ion secondary battery according to the present invention, which is a cross-sectional view taken along the A-A' line of FIG. 1 when the battery of FIG. 1 is a wound-type battery.
Figure 6A:
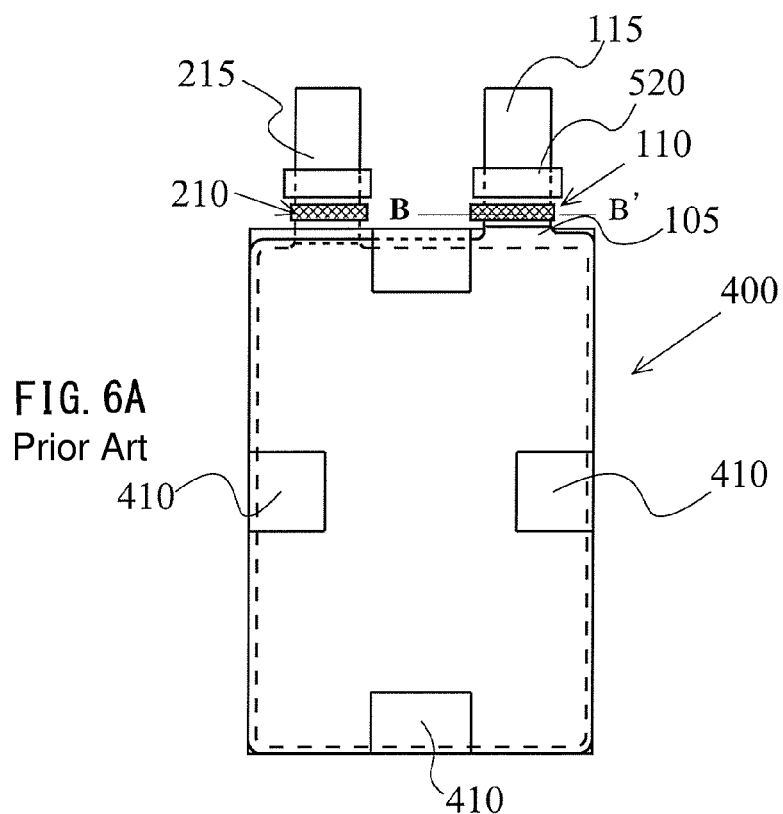
Figure 6B:
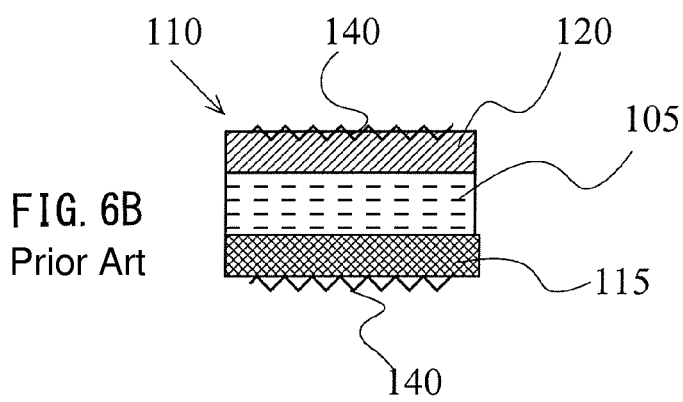

FIG. 5 is a cross-sectional view taken along the A-A' line of FIG. 1A when the battery of FIGS. 1A and 1B is a wound-type battery. In the wound-type battery of this example, the positive- and negative-electrode tabs may each be formed by joining a conductive member to the collector, or may be formed integrally with the collector. The positive electrode tabs 105 are joined to the positive electrode lead tab 115 having a higher strength than that thereof by the ultrasonic joining through the positive electrode side joint portion 110; similarly, the negative electrode tabs are joined to the negative electrode lead tab having a higher strength than that thereof by the ultrasonic joining through the negative electrode side joint portion. After that, the resultant positive electrode tabs and negative electrode tabs are accommodated in the outer covering, followed by sealing.

The positive electrode side joint portion and negative electrode side joint portion are formed in the same manner as that for the stacked-type lithium-ion secondary battery, and whereby it is possible to provide a battery which is unlikely to cause damage by the surface abnormal portion.

On the positive electrode side, the positive electrode tab, metal plate, and positive electrode lead tab can all be formed of aluminum. On the negative electrode side, the negative electrode tab can be formed of a nickel-plated copper plate or a nickel plate, and the metal plate can be formed of a nickel plate.

In the present invention, although the surface abnormal portions of the joint portions on both the positive- and negative-electrode sides are preferably covered with the metal plate, it is possible to cover only the surface abnormal portion on the negative electrode side at which hardness of the constituent member is high and the damage is more likely to occur than at the positive electrode side.

INDUSTRIAL APPLICABILITY

In the present invention, the joint portions at which the lead tabs of the positive and negative electrodes are joined to the positive- and negative-electrode lead tabs, respectively, by the ultrasonic joining are each covered with the metal plate used as a protective member for the joint portion. This prevents short-circuiting and damage on the constituent member, which are caused due to presence of the surface abnormal portion formed in the joint portion by the ultrasonic joining, so that it is possible to provide a lithium-ion secondary battery excellent in characteristics.

EXPLANATION OF REFERENCE SYMBOLS

1: Stacked-type lithium-ion secondary battery
100: Positive electrode
200: Negative electrode
205: Negative electrode tab
210: Joint portion
300: Separator
400: Electrode stacked body
105: Positive electrode tab
110: Joint portion
115: Positive electrode lead tab
120: Metal plate
140, 140A, 140B: Surface abnormal portion
205: Negative electrode tab
215: Negative electrode lead tab
500: Film-like outer covering
510: Sealing portion
520: Gasket portion
410: Adhesive tape

The invention claimed is:

1. A lithium-ion secondary battery comprising:
an electrode body in which a positive electrode and a negative electrode are stacked or wound through a separator;
a plurality of positive electrode tabs drawn from the electrode body;
a plurality of negative electrode tabs drawn from the electrode body;
a joint portion between the positive electrode tabs and a positive electrode lead tab; and
a joint portion between the negative electrode tabs and a negative electrode lead tab, wherein
a part of a metal plate is disposed on a surface of the positive electrode tab or positive electrode lead tab in the joint portion and on a surface of the negative electrode tab or negative electrode lead tab in the joint portion and joined integrally thereto,
a remaining part of the metal plate is wound around the joint portions,
the remaining part of the metal plate is folded to cover a surface abnormal portion formed at the portion at which the metal plate is joined to the joint portion, and is further wound around an outer periphery of the joint portion to a portion that covers another surface abnormal portion formed on a second surface which is opposite to first surface on which the surface abnormal portion is formed on the metal plate, and
the metal plate is wound around the first surface and the second surface.

2. The lithium-ion secondary battery according to claim 1, wherein
the metal plate is wound by one round or more from a portion at which it is joined to the joint portion.

3. The lithium-ion secondary battery according to claim 1, wherein the joining portion and metal plate are each covered with a synthetic resin layer.

4. The lithium-ion secondary battery according to claim 3, wherein
the synthetic resin layer is a modified polyphenylene ether layer.

5. A lithium-ion secondary battery comprising:
an electrode body in which a positive electrode and a negative electrode are stacked or wound through a separator;
a plurality of positive electrode tabs drawn from the electrode body;
a plurality of negative electrode tabs drawn from the electrode body;
a joint portion between the positive electrode tabs and a positive electrode lead tab; and
a joint portion between the negative electrode tabs and a negative electrode lead tab, wherein
a part of a metal plate is disposed on a surface of the positive electrode tab or positive electrode lead tab in the joint portion and on a surface of the negative electrode tab or negative electrode lead tab in the joint portion and joined integrally thereto,
a remaining part of the metal plate is wound around the joint portions,
the remaining part of the metal plate is folded back on itself so as to cover a surface abnormal portion formed at the portion at which the metal plate is joined to the joint portion, and is further wound around an outer periphery of the joint portion to a portion that covers another surface abnormal portion formed on a second surface which is opposite to first surface on which the surface abnormal portion is formed at the folded-back portion of the metal plate, and
the metal plate is wound around the first surface and the second surface.

* * * * *